United States Patent [19]

Tullis

[11] Patent Number: 5,538,276
[45] Date of Patent: Jul. 23, 1996

[54] TUNABLE AIR SPRING

[76] Inventor: Jay K. Tullis, 18496 Centennial St., Hesperia, Calif. 92345

[21] Appl. No.: 447,589

[22] Filed: May 23, 1995

[51] Int. Cl.⁶ ................................................. B60G 11/26
[52] U.S. Cl. ............................................................ 280/708
[58] Field of Search ........................... 280/708; 188/299, 188/319

[56] References Cited

U.S. PATENT DOCUMENTS

| | | |
|---|---|---|
| 1,446,793 | 2/1923 | Gruss . |
| 2,564,790 | 8/1951 | Orloff et al. . |
| 2,769,632 | 11/1956 | Bourcier de Carbon . |
| 2,856,035 | 10/1958 | Rohacs . |
| 2,959,410 | 11/1960 | Fullam et al. . |
| 2,992,864 | 7/1961 | Bourcier de Carbon . |
| 3,854,710 | 12/1974 | Nicholls . |
| 4,219,190 | 8/1980 | Nagase . |
| 4,360,192 | 11/1982 | Ishida . |
| 4,596,513 | 6/1986 | Carlson et al. . |
| 4,805,882 | 2/1989 | Veaux et al. . |

Primary Examiner—Kenneth R. Rice
Attorney, Agent, or Firm—Lowe, Price, LeBlanc & Becker

[57] ABSTRACT

A tunable air spring/shock absorber comprises a cylinder, a piston rod extending out of the cylinder through a lower end thereof, and rod guide provided on the lower end of the cylinder for guiding the piston rod, a seal mounted on the rod guide and piston containing valving components to deliver desired force-velocity characteristics for rebound and compression mounted on the piston rod. The piston is submerged in oil during the complete stroke of the air spring/shock absorber. On top of the piston, a spacer is provided which separates a sealing disk or piston that hermetically separates a counter spring chamber and a main spring chamber. The tunable air spring/shock absorber has an upper closure on the cylinder with a valve that allows pressurization of the main spring chamber.

17 Claims, 3 Drawing Sheets

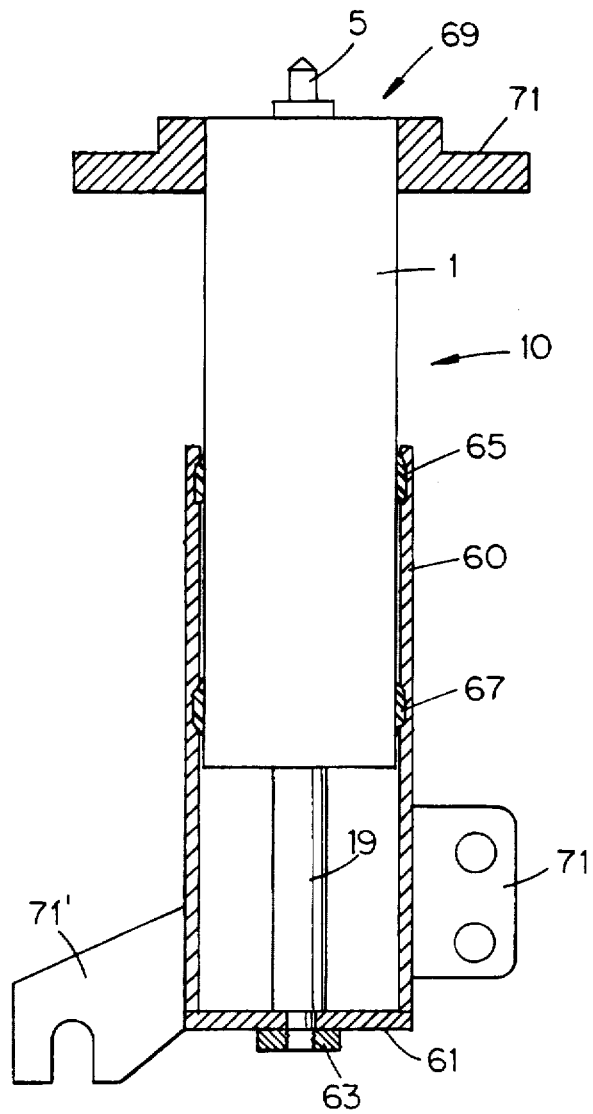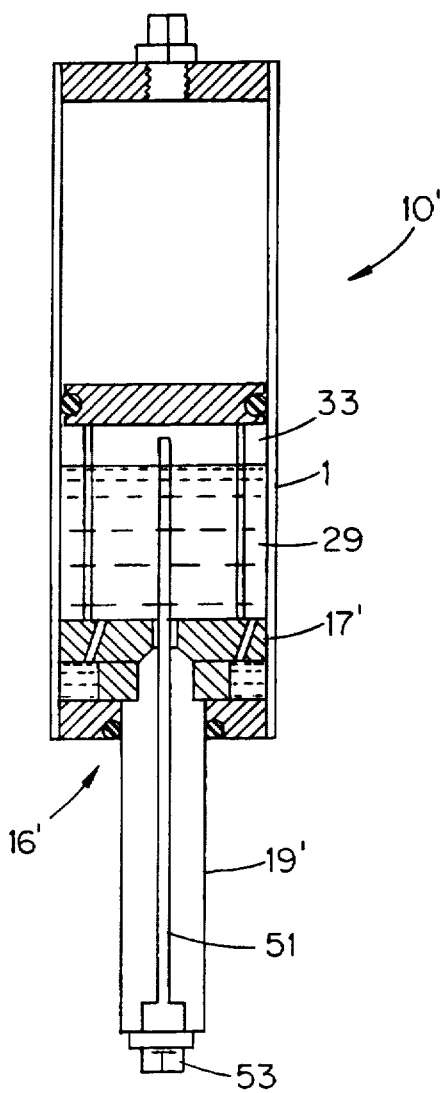
FIG. 7
FIG. 6

TUNABLE AIR SPRING

FIELD OF THE INVENTION

The present invention is directed to a tunable air spring and shock absorber and, in particular, to a device that utilizes two pressurized chambers to develop a usable spring rate for a variety of applications.

BACKGROUND ART

The use of a variety of shock absorbing devices for vehicles or the like is well known in the prior art. Typically, a suspension for land vehicles consists of a spring of some kind and a shock absorber that are mounted between suspended and non-suspended masses.

Commonly used springs include coil springs, leaf springs or torsion bars. These device consume a considerable amount of space in the vehicle and are also heavy and expensive.

Alternatively, air springs have been proposed to overcome the disadvantages noted above for mechanical springs. However, air springs are not without their disadvantages. These types of springs are also very expensive and space consuming due to their a very narrow band of spring rate values, vehicle height settings and usable suspension travels.

In view of the disadvantages noted above for both air springs and coil springs or the like, a need has developed to provide an improved spring for suspending a mass, particularly land vehicles.

In response to this need, the present invention provides a tunable air spring and shock absorber assembly which overcomes the deficiencies in the prior art. The inventive tunable air spring and shock absorber assembly is adaptable over a wide range of spring rates, preloads for setting vehicle heights and usable suspension travels.

SUMMARY OF THE INVENTION

Accordingly, it is a first object of the present invention to provide a combined suspension unit including both a shock absorber and a spring to suspend a desired mass.

Another object of the present invention is to provide a tunable air spring and shock absorber to fit a very wide range of spring rates, preloads and usable suspension travels.

Another object of the present invention is to provide a compact and simply constructed tunable air spring and shock absorber.

Other objects and advantages of the present invention will become apparent as a description thereof proceeds.

In satisfaction of the foregoing objects and advantages, the present invention provides a tunable air spring and shock absorber which comprises a cylinder having a cap sealing an upper end thereof and a shock absorbing piston and piston rod assembly slidably mounted therein. The cylinder also includes a plug sealing a bottom of the cylinder, the plug including a bore to permit travel of the piston rod therethrough.

A transfer piston is slidably mounted within the cylinder and disposed between the cap and the shock absorbing piston to form a first pressurized space between the cap and the transfer piston as a main spring chamber. The transfer piston and shock absorbing piston also create a second pressurized space therebetween which acts as a counter spring chamber. A non-compressible fluid such as oil is provided, the oil occupying the space between the shock absorbing piston and plug and an additional space between the piston and transfer piston.

The shock absorbing piston also includes valving components therein to permit oil flow through the shock absorbing piston during piston travel.

In operation, upward movement of the shock absorbing piston pressurizes the main spring chamber and depressurizes the counter spring chamber to form a tunable air spring with a usable spring rate over a stroke of the piston.

The cap includes a valve thereon which permits adjustment of the volume/pressure in the main spring chamber for tuning of the air spring. Likewise the counter spring chamber can also be adjusted in volume and pressure either alone or in combination with the main spring chamber for spring adjustment.

Preferably, a spacer is provided to maintain a space between the transfer piston and shock absorbing piston to allow for depressurization of the counter spring chamber when the shock absorbing piston is compressed and for oil flow to the space created between the cylinder plug and shock absorbing piston.

BRIEF DESCRIPTION OF DRAWINGS

Reference is now made to the drawings of the invention wherein:

FIG. 6 is an alternative embodiment of the tunable air spring and shock absorber; and FIG. 7 shows an exemplary mounting of the tunable air spring and shock absorber.

DESCRIPTION OF THE PREFERRED EMBODIMENTS

Figure 1:
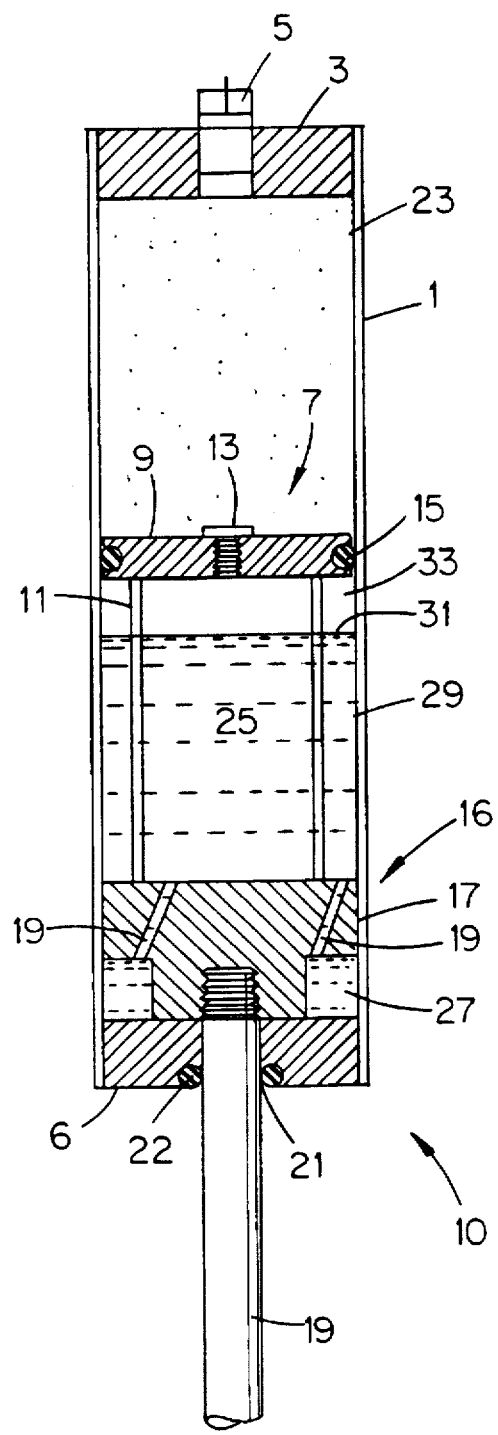
FIG. 1 is a longitudinal sectional view of the inventive tunable air spring and shock absorber in an extended position.
Figure 2:
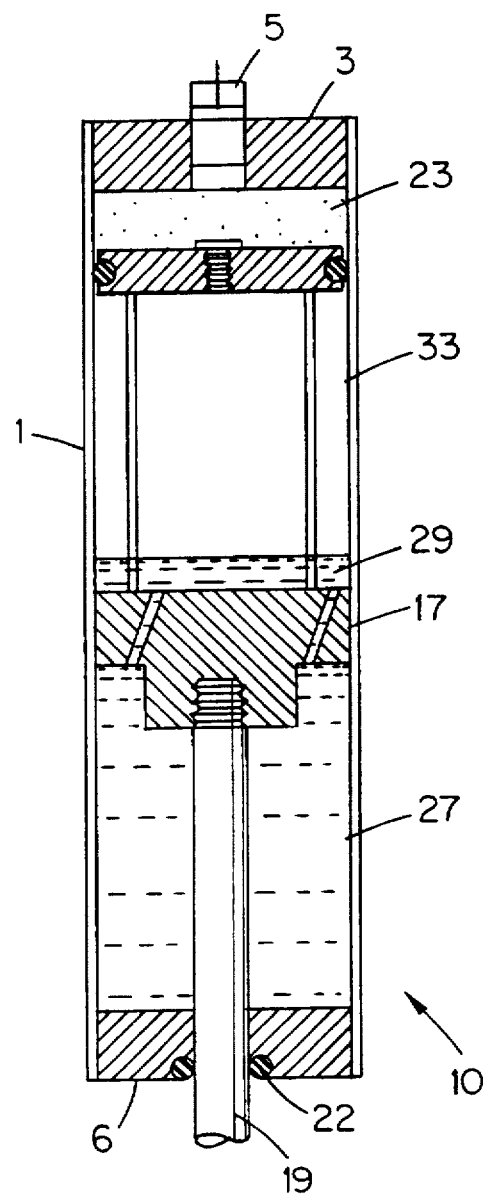
FIG. 2 is a longitudinal sectional view of the tunable air spring and shock absorber in a compressed position.

With reference to FIGS. 1 and 2, one embodiment of the inventive tunable spring is generally designated by the reference numeral 10. In FIG. 1, the tunable spring 10 is shown in the extended position, FIG. 2 showing the tunable spring in the retracted or compressed position.

The tunable spring includes a cylinder 1 having an end cap 3 on one end with a plug 5 on the other end. The cap 3 can be secured to the cylinder 1 in any conventional fashion.

The end cap 3 includes a valve assembly 5 such as a Schrader valve or a tire valve which are known in the art. The function of the valve will be described below.

Slidably mounted within the cylinder which is tubular in shape is a transfer piston assembly 7. The transfer piston assembly 7 includes a transfer piston 9 and a transfer spacer 11. The spacer 11 can be made integrally part of the transfer piston 9, the shock absorber piston described below or can be separate therefrom and attached in any known manner.

The transfer piston also includes a transfer plug 13 and an o-ring seal 15 or other known sealing means, the functions thereof being described below.

Also slidably mounted within the tubular cylinder 1 is a assembly 16 comprising a piston 17 with a piston rod 19 threadably engaged thereto. Of course, the piston rod could be integrally formed so with the piston, such as by welding or riveting, if desired. The piston rod is sized to travel between a bore 21 in the plug 5, the bore sealed by O-ring or rod seal 22.

The piston 17 includes desired valving components which are schematically represented by bores 19 therethrough. The function of the bores 19 will also be described below.

Referring to FIG. 1, the cap 3 and transfer piston 9 form a main spring chamber 23 that is pressurized with a gas, preferably air. Control of the gas pressure is achieved using the valve 5.

The tunable air spring includes a volume of oil 25 which occupies the space between the underside of the piston 17 designated by the reference numeral 27 and a space above the piston designated by the reference numeral 29. The space 29 is formed by the cylindrical spacer 11 but can be formed by any type of a spacer. The spacer could have perforations or openings therein to allow oil flow therethrough. The transfer piston 9, transfer piston spacer 11 and piston 17 can also be made of one-piece construction also.

The oil 25 and transfer piston 9 form a counter spring chamber 33 disposed between the underside of the transfer piston 9 and the upper level of the oil 31.

The bores 19 in the piston 17 allow flow through of the oil 25 between the spaces 27 and 29 during longitudinal translation of the piston 17 and piston rod 19. Although two bores are depicted as valving components in the piston 17, any known valving component could be utilized to permit the flow of oil 25 between the spaces 27 and 29. It should be understood that these valving components, e.g. spring loaded check valves, are conventional in the shock absorber art and do not require further detail.

The chamber 33 is also gas filled and pressurized to a desired level. The chamber 33 pressure can be varied, in one embodiment, using the plug 13 in the transfer piston 9 when done during assembly of the unit. Otherwise it is done at will after assembly these valves 53 in which case plug 13 is not necessary. (FIG. 6)

The function of the tunable air spring will now be described. First, referring to FIG. 2, wherein the piston 17 and piston rod 19 are in an extended position, a shock compresses the tunable air spring a certain stroke. This compression results in the transfer of the shock to the piston rod and piston 17. The shock absorber piston 17 then pushes the transfer piston 9 by means of the transfer piston spacer 11. This movement of the transfer piston causes the main spring air volume in the main spring chamber 25 to decrease and hence increase the pressure in the main spring chamber. This increase in pressure follows the general law of gases wherein:

$$\frac{P_i \times V_i}{T_i} = \frac{P_f \times V_f}{T_f} ;$$

wherein $P_1$=initial pressure;

$P_f$=final pressure;

$T_1$=initial temperature; and $T_f$=final temperature.

When considering temperature as a constant, the law converts to:

$$P_1 \times V_1 = P_f \times V_f,$$

or $$P_f = \frac{P_i \times V_i}{V_f} .$$

Figure 3:
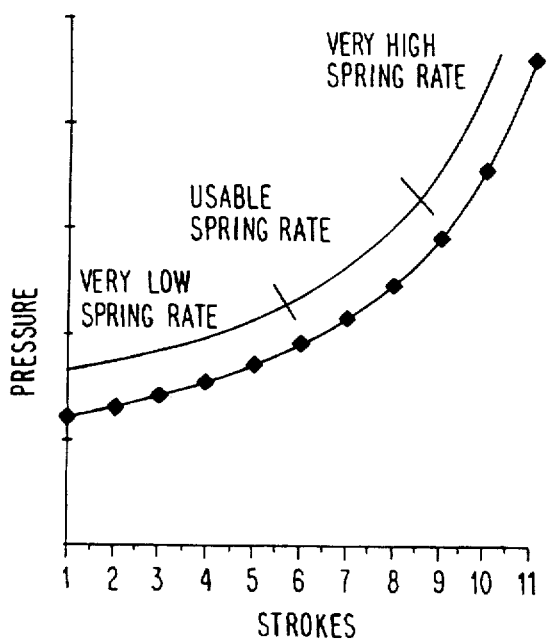
FIG. 3 is a pressure versus stroke curve for a spring.

Plotting the pressure in the main spring chamber 23 against stroke, a curve is generated as shown in FIG. 3. This figure is typical of prior art air springs which are commonly used but exhibit a very narrow band of spring rate values, vehicle height settings and a usable suspension travel. As is evident from FIG. 3, the usable spring rate extends over only a portion of the curve.

Figure 4:
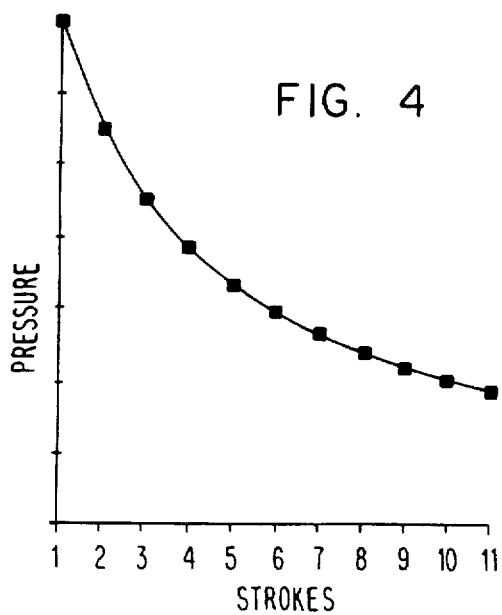
FIG. 4 is a pressure versus stroke curve for the counter spring of the invention.

Referring again to FIGS. 1 and 2, as the piston 17 is compressed, the volume of oil 29 above the piston 17 has to flow through the bores 19 in the piston 17 to the space 27 to keep it full. This oil movement causes the air in chamber 33 to expand and the pressure in chamber 33 decreases according to the general law of gases described above. FIG. 4 depicts the plot of pressure against stroke for chamber 33, i.e., the counter spring chamber of the inventive tunable air spring. As can be seen from FIG. 4, the pressure decreases with stroke.

Figure 5:
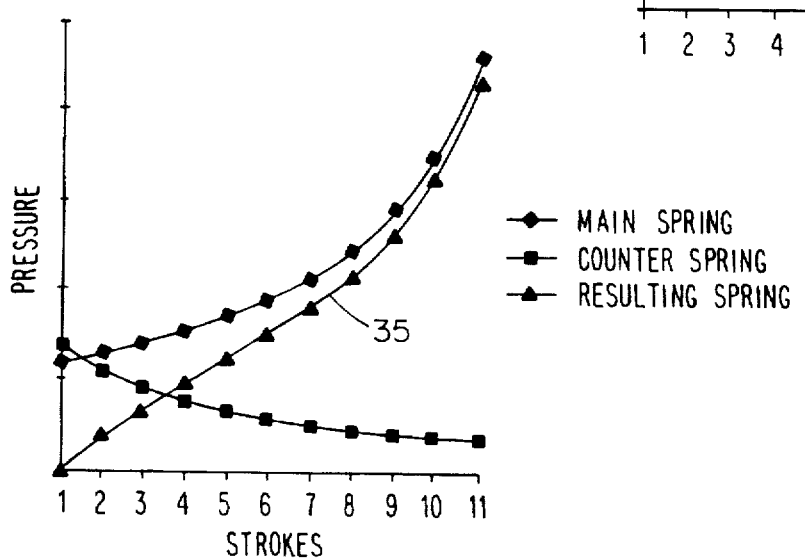
FIG. 5 shows the combined pressure versus stroke curves of FIGS. 3 and 4.

With the inventive tunable spring combining the main spring chamber 23 with the counter spring chamber 33 in one device, a spring having a usable rate all the way of the stroke is produced. Referring to FIG. 5, a plot of pressure versus stroke is shown when combining the main spring and counter spring. The resulting spring action designated by the reference numeral 35 exhibits a usable spring rate which is vastly extended over that shown in FIG. 3.

In another aspect of the invention, the tunable air spring includes the capability of adjusting or tuning the spring rate. That is, the volume and/or pressure of the main spring chamber 23 can be varied using the valve 5. Likewise, the counter spring chamber 33 pressure and/or volume can also be varied for a given spring. By adjusting the initial pressure in either or both of these chambers, the usable spring rate can be adjusted for a given application. Thus, the inventive tunable spring is adaptable to fit a very wide range of spring rates, preloads (for setting vehicle height) and usable suspension travels. This adjustment can be easily achieved by a simple pressure and/or volume adjustment in one or both of the spring chambers 23 and 33.

With reference to FIG. 6, an alternative embodiment of the tunable air spring is generally designated by the reference numeral 10'. In this embodiment, a piston and piston rod assembly 16' is provided to facilitate pressurizing counter spring chamber 33. The piston and piston rod assembly 16' includes a piston 17' and piston rod 19'. The assembly 16' also includes a tubular member 51 which extends through the piston rod 19 and oil volume 29 into the chamber 33. With the tubular member 51 and valve 53, (similar to valve 5) the volume and/or pressure of the chamber 33 can be adjusted to a desired spring rate remotely.

The piston rod 19' can be hollow to receive the tubular member 51 or can have a bore sized to receive the member 51.

FIG. 7 shows an exemplary mounting arrangement for the tunable air spring 10. An outer housing 60 is provided which is sized to receive the cylindrical spring 10. The piston rod 19 extends through an opening in a bottom plate 61 of the housing. The piston rod is secured to the housing 60 by nut 63 threadably engaging complementary threads on the end of the rod 19.

Upper and lower guide bushings, 65 and 67, respectively are provided between the cylinder 1 and housing 60. These bushings allow for a slidable movement of the cylinder 1 within the outer housing 60.

The end 69 of the cylinder 1 is shown mounted to the mass 71 to be suspended. This mounting can be done in any conventional fashion, for example, bolts, screws, ball joints or the like.

The housing 60 can then be mounted to a nonsuspended mass using either of the flanges 71 or 71' as desired. Of course, other mounting means or configurations could be employed to attach the housing 60 to the non-suspended mass. For example, the flange 71 could be attached to the axle or some other structural component connected to the wheel of a vehicle with the end 69 of the cylinder 1 attached to the vehicle frame.

The inventive tunable air spring provides a greater degree of flexibility over more commonly used springs such as coil springs, leaf springs, torsion bars or air springs. The inventive tunable spring allows for the capability of achieving a wide range of a usable spring rates so that the tunable air spring is adaptable for different load applications, vehicles or the like.

As such, an invention has been disclosed in terms of preferred embodiments thereof which fulfill each and every one of the objects of the present invention and provides a new and improved tunable air spring.

Of course, various changes, modifications, and alterations from the teachings of the present invention may be contemplated by those skilled in the art without departing from the intended spirit and scope thereof. Accordingly, it is intended that the present invention only be limited by the terms of the appended claims.

I claim:

1. A tunable spring and shock absorber comprising:
   a) a cylinder having a cap sealing an upper end thereof;
   b) a piston and piston rod assembly slidable within said cylinder;
   c) a plug sealing a bottom end of said cylinder, said plug including a bore allowing travel of said piston rod therethrough;
   d) a transfer piston slidably mounted within said cylinder and disposed between said cap and said piston to form a first pressurized space between said piston and said cap forming a main spring chamber and a second pressurized space between said transfer piston and said piston forming a counter spring chamber, and wherein an oil chamber is formed between said piston and said plug with oil therein, said piston including at least one valve component therein for oil to flow between said counter spring chamber and said oil chamber when said piston and piston rod travel within said cylinder, wherein upward movement of said piston pressurizes said main spring chamber and depressurizes said counter spring chamber to form said tunable spring with a usable rate over a stroke of said piston.

2. The tunable spring of claim 1 wherein said cap has a valve thereon to permit adjustment of the pressure of said main spring chamber.

3. The tunable spring of claim 1 wherein said piston rod and piston include a passageway therethrough, said passageway including a valve therein to permit adjustment of pressure in said counter spring chamber.

4. The tunable spring of claim 1 wherein said cylinder includes means for mounting to a vehicle.

5. The tunable air spring of claim 1 further comprising a spacer separating said transfer piston from said piston.

6. The tunable air spring of claim 5 wherein said spacer is attached to said transfer piston.

7. The tunable air-spring of claim 1 wherein said transfer piston has a bore therethrough and a stopper in said bore, said bore facilitating pressurization of said counter spring chamber.

8. The tunable air spring of claim 1 wherein said piston rod is threadably engaged to said piston.

9. The tunable air spring of claim 1 wherein said transfer piston includes a sealing ring on an outer circumferential surface of said piston,
   said sealing ring engaging an inner surface of said cylinder to separate and seal said main spring chamber from said counter spring chamber.

10. The tunable air spring of claim 4 wherein said means for mounting further comprises a cylindrically shaped retainer having an open end and closed bottom, said retainer sized to receive said cylinder and to engage said piston rod, said retainer including a flange for attachment to said vehicle.

11. The tunable air spring of claim 1 wherein said plug has a seal ring engaging said piston rod, said seal ring preventing loss of oil from said oil chamber.

12. A tunable air spring comprising:
   a) a cylinder having a cap sealing an upper end thereof;
   b) a piston and piston rod assembly slidable within said cylinder;
   c) a plug sealing a bottom end of said cylinder, said plug including a bore therethrough allowing travel of said piston rod therethrough;
   d) a transfer piston slidably mounted within said cylinder and disposed between said cap and said piston to form:
      i) a first pressurized main spring chamber between said cap and said transfer piston;
      ii) a second pressurized counter spring chamber between said transfer piston and said piston,
   e) a cylindrical spacer positioned between said piston and said transfer piston
   f) an oil-containing chamber formed between said piston and said plug; said piston including a pair of valving components, one to regulate compression and one to regulate rebound;
   g) a first seal ring surrounding an outer circumferential surface of said transfer piston to provide a seal between said main spring chamber and said counter spring chamber; and
   h) a second seal ring in said bore of said plug to seal said oil chamber;
   i) wherein upward movement of said piston pressurizes said main spring chamber and depressurizes said counter spring chamber to form said tunable spring with a usable rate over a stroke of said piston.

13. The tunable spring of claim 12 wherein said piston rod and piston include a passageway therethrough, said passageway including a valve therein to permit adjustment of pressure in said counter spring chamber.

14. The tunable spring of claim 12 wherein said cylinder includes means for mounting to a vehicle.

15. The tunable air spring of claim 14 wherein said means for mounting further comprises a cylindrically shaped retainer having an open end and closed bottom, said retainer sized to receive said cylinder and to engage said piston rod, said retainer including a flange for attachment to said vehicle.

16. The tunable air spring of claim 12 wherein said transfer piston has a bore therethrough and a stopper in said bore, said bore facilitating pressurization of said counter spring chamber.

17. The tunable spring of claim 12 wherein said cap has a valve thereon to permit adjustment of the pressure of said main spring chamber.

* * * * *